US011599522B2

(12) United States Patent
Todd et al.

(10) Patent No.: US 11,599,522 B2
(45) Date of Patent: Mar. 7, 2023

(54) HARDWARE TRUST BOUNDARIES AND GRAPHS IN A DATA CONFIDENCE FABRIC

(71) Applicant: EMC IP Holding Company LLC, Hopkinton, MA (US)

(72) Inventors: Stephen James Todd, Center Conway, NH (US); Jason A. Shepherd, Austin, TX (US); Gaurav Chawla, Austin, TX (US); Aurelian Dumitru, Round Rock, TX (US); Jimmy Doyle Pike, Georgetown, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 197 days.

(21) Appl. No.: 16/667,553

(22) Filed: Oct. 29, 2019

(65) Prior Publication Data

US 2021/0124728 A1    Apr. 29, 2021

(51) Int. Cl.
*G06F 16/23*     (2019.01)
*G06F 16/901*    (2019.01)
*G06F 21/50*     (2013.01)

(52) U.S. Cl.
CPC ...... *G06F 16/2365* (2019.01); *G06F 16/9024* (2019.01); *G06F 21/50* (2013.01)

(58) Field of Classification Search
CPC .......... G06F 21/57; G06F 21/44; G06F 21/64; G06F 21/60; G06F 21/50; G06F 2221/2129; G06F 16/2365; G06F 16/9024; H04L 9/0897; H04L 9/3234; H04L 9/321; H04L 2209/127; H04L 9/006; H04L 9/083; H04L 63/20
See application file for complete search history.

(56) References Cited

U.S. PATENT DOCUMENTS

| 9,256,656 | B2* | 2/2016 | Fankhauser | G06F 16/254 |
| 9,819,679 | B1* | 11/2017 | Bertz | H04W 12/06 |
| 10,282,719 | B1* | 5/2019 | Paczkowski | H04W 12/40 |
| 11,070,579 | B1* | 7/2021 | Kiernan | H04L 63/20 |
| 11,297,089 | B2* | 4/2022 | Boulton | H04W 12/66 |
| 2007/0203781 | A1* | 8/2007 | Kerschbaum | G06Q 10/0635 |
| | | | | 705/7.28 |
| 2010/0031027 | A1* | 2/2010 | Thomas | H04L 9/3265 |
| | | | | 713/156 |

(Continued)

FOREIGN PATENT DOCUMENTS

WO    WO-2017136406 A1 *   8/2017   ............. H04L 41/28

OTHER PUBLICATIONS

D. McIntyre, F. Wolff, C. Papachristou, S. Bhunia and D. Weyer, "Dynamic evaluation of hardware trust," 2009 IEEE International Workshop on Hardware-Oriented Security and Trust, 2009, pp. 108-111, doi: 10.1109/HST.2009.5224990. (Year: 2009).*

(Continued)

*Primary Examiner* — Dennis Truong
(74) *Attorney, Agent, or Firm* — Workman Nydegger (57) ABSTRACT

Hardware trust boundaries in a data confidence fabric are provided. Nodes in a data confidence fabric are provisioned with identifies and confidence scores. Hardware-based trust insertion technologies are applied to data in the data confidence fabric. Protocols allow nodes to join the data confidence fabric and be aware of other nodes. Paths of data can be graphed and audited.

16 Claims, 6 Drawing Sheets

(56) References Cited

U.S. PATENT DOCUMENTS

| | | | | |
|---|---|---|---|---|
| 2011/0010543 | A1* | 1/2011 | Schmidt | H04W 12/08 713/168 |
| 2011/0060947 | A1* | 3/2011 | Song | H04L 63/1433 714/37 |
| 2011/0209195 | A1* | 8/2011 | Kennedy | H04L 63/20 726/4 |
| 2012/0163589 | A1* | 6/2012 | Johnson | G06F 21/57 380/30 |
| 2013/0345530 | A1* | 12/2013 | McRoberts | H04L 63/08 600/323 |
| 2014/0089650 | A1* | 3/2014 | Polzin | G06F 21/81 713/2 |
| 2014/0250496 | A1* | 9/2014 | Amidon | G06F 7/02 726/3 |
| 2014/0283031 | A1* | 9/2014 | Eksten | G06F 21/51 726/22 |
| 2014/0297887 | A1* | 10/2014 | Nema | H04L 67/306 709/240 |
| 2015/0254017 | A1* | 9/2015 | Soja | G06F 3/0637 711/163 |
| 2015/0269048 | A1* | 9/2015 | Marr | H04L 41/147 714/2 |
| 2016/0277424 | A1* | 9/2016 | Mawji | H04L 63/1408 |
| 2016/0350534 | A1* | 12/2016 | Poornachandran | H04L 9/3273 |
| 2016/0359897 | A1* | 12/2016 | Yadav | G06F 16/248 |
| 2018/0069867 | A1* | 3/2018 | Grajek | H04W 12/062 |
| 2018/0077028 | A1* | 3/2018 | Rich | H04L 43/0817 |
| 2019/0207957 | A1* | 7/2019 | Espinosa | H04L 63/1425 |
| 2019/0260653 | A1* | 8/2019 | Yadav | H04L 47/28 |
| 2020/0019898 | A1* | 1/2020 | Harrison | H04L 9/3239 |
| 2020/0076829 | A1* | 3/2020 | Wentz | H04L 9/3297 |
| 2020/0167786 | A1* | 5/2020 | Kursun | H04L 63/08 |
| 2020/0250478 | A1* | 8/2020 | Jain | G06Q 30/0201 |

OTHER PUBLICATIONS

Kandah et al. A hardware-software codesign approach to identity, trust, and resilience for iot/cps at scale. IEEE Smart Data (SmartData) Jul. 14, 2019 (pp. 1125-1134). IEEE. (Year: 2019).*

S. Destercke, P. Buche and B. Charnomordic, "Evaluating Data Reliability: An Evidential Answer with Application to a Web-Enabled Data Warehouse," in IEEE Transactions on Knowledge and Data Engineering, vol. 25, No. 1, pp. 92-105, Jan. 2013, doi: 10.1109/TKDE.2011.179. (Year: 2013).*

* cited by examiner

HARDWARE TRUST BOUNDARIES AND GRAPHS IN A DATA CONFIDENCE FABRIC

FIELD OF THE INVENTION

Embodiments of the present invention generally relate to computing systems such as data confidence fabrics and other ecosystems configured to associate data or data streams with confidence information. More particularly, embodiments of the invention relate to systems, hardware, software, computer-readable media, and methods for providing hardware trust boundaries and graphs in data confidence fabrics.

BACKGROUND

Computing and other electronic devices come in a variety of types and form factors and have varying capabilities. Many of these devices generate data that may be used by various applications. There is often a question, however, about the value of the data. In other words, applications prefer to use data in which there is high confidence. Applications that run using data associated with high confidence levels typically generate more reliable results and outputs.

A data confidence fabric (DCF) is generally descriptive of systems that are able to add trust or confidence scores to data as the data flows within the DCF. However, there many issues related to the ability of the DCF to accurately and reliably add confidence scores to the ingested data. Conventionally, the DCF was typically defined by software. However, software does not account for the hardware upon which the DCF software executes.

More specifically, the hardware upon which DCFs run does not have visibility into the configuration of a DCF and is not aware of how trust or confidence scores are added to the data. This general lack of awareness makes it difficult for the hardware to best protect and enhance the data flowing in the DCF. In addition, this lack of awareness effectively prevents the hardware from contributing to the confidence scores in a meaningful manner.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to computing systems or ecosystems such as data confidence fabrics (DCFs). In one example, a DCF is a system of hardware (computers, servers, routers, network interface cards, storage including immutable storage and/or other hardware) that is provisioned (e.g., with software, services) to score or rank data that may be ingested into the DCF. The data ingested into the DCF can be made available to applications, which may also be part of the DCF. The applications can leverage the confidence scores of the data when operating.

In one example, a DCF is generally configured to add confidence information to data. Embodiments of the invention allow confidence scores to be added from a hardware perspective and/or a software perspective. Embodiments of the invention relate to DCF configurations with defined hardware boundaries, trusted and auditable node connectivity and trusted and auditable interactions with foreign or unknown DCFs.

A data confidence fabric, by way of example only, may be an architecture and set of services that allow data to be ingested into a system for use by applications. The DCF adds or provides trust information or scores to the data as the data flows through the DCF. The ingested data is associated with a trust or confidence score that provides a view into the trustworthiness of the data to an application or other use. Embodiments of the invention relate to the hardware aspect of DCFs and the ability of hardware to contribute to confidence scores of the data being ingested and provided to applications.

More particularly, at least some embodiments of the invention relate to systems, hardware, software, computer-readable media, and methods for contributing to data confidence scores based on hardware, hardware interactions, node connectivity within a DCF, or the like or combination thereof. Embodiments of the invention may cooperate with confidence scores that are closely aligned with software or other services.

A DCF may include various interconnected hardware environments (e.g., nodes). These nodes may have varying hardware capabilities and are examples of trust insertion technologies or hardware-assisted trust insertion technologies. The hardware is configured such that as data flows from data sources to storage or to applications in a DCF system, scores can be attached or associated with the data. As the data is handled by various forms of trust insertion technologies, the overall score or ranking (e.g., a confidence or trustworthiness score) of the data may change. The data scored or ranked in the DCF system may be stored in various locations, such as a data lake, in a datacenter, Public Cloud data storage service, or the like. The data scored or ranked in the DCF system can be made available to one or more applications or other clients or users. The data may also be stored with confidence information. The confidence information may include confidence scores, tables, audit trail and other information discussed herein.

Confidence scores, which may be determined from hardware aspects and/or software aspects of a DCF, allow an application to explore or exploit the data for potential analysis or consumption. The score or rank of the data allows an application to understand or account for the trustworthiness of the data. For example, the confidence score of the data may have a significant impact on whether the data is actually used by the application. An application may require a minimum confidence score or have other requirements related to the confidence score.

Embodiments of the invention, by way of example, provide a DCF system or configuration that provides or establishes defined hardware boundaries, trusted and auditable node connectivity within the DCF, and trusted and auditable interactions with other DCFs. A DCF is able to give or associate data with scores from individual trust insertion technologies that can be combined in multiple ways to determine a final score or rank that relates to the trustworthiness of the data. The scores provided from a hardware perspective can be maintained separately from confidence scores from a software perspective. The scores can also be combined into an overall score.

For example, an application operating in a nuclear facility may need to use data that is very trustworthy (have a high confidence score) while data that is used by an application to control lights in a home may not need to be as trustworthy (a lower confidence score is acceptable). In the context of a nuclear facility, an application may require that the hardware handling the data be firewalled from outside sources, provide hardware assisted encryption, deterministic routing, or the like or combination thereof.

Figure 1:
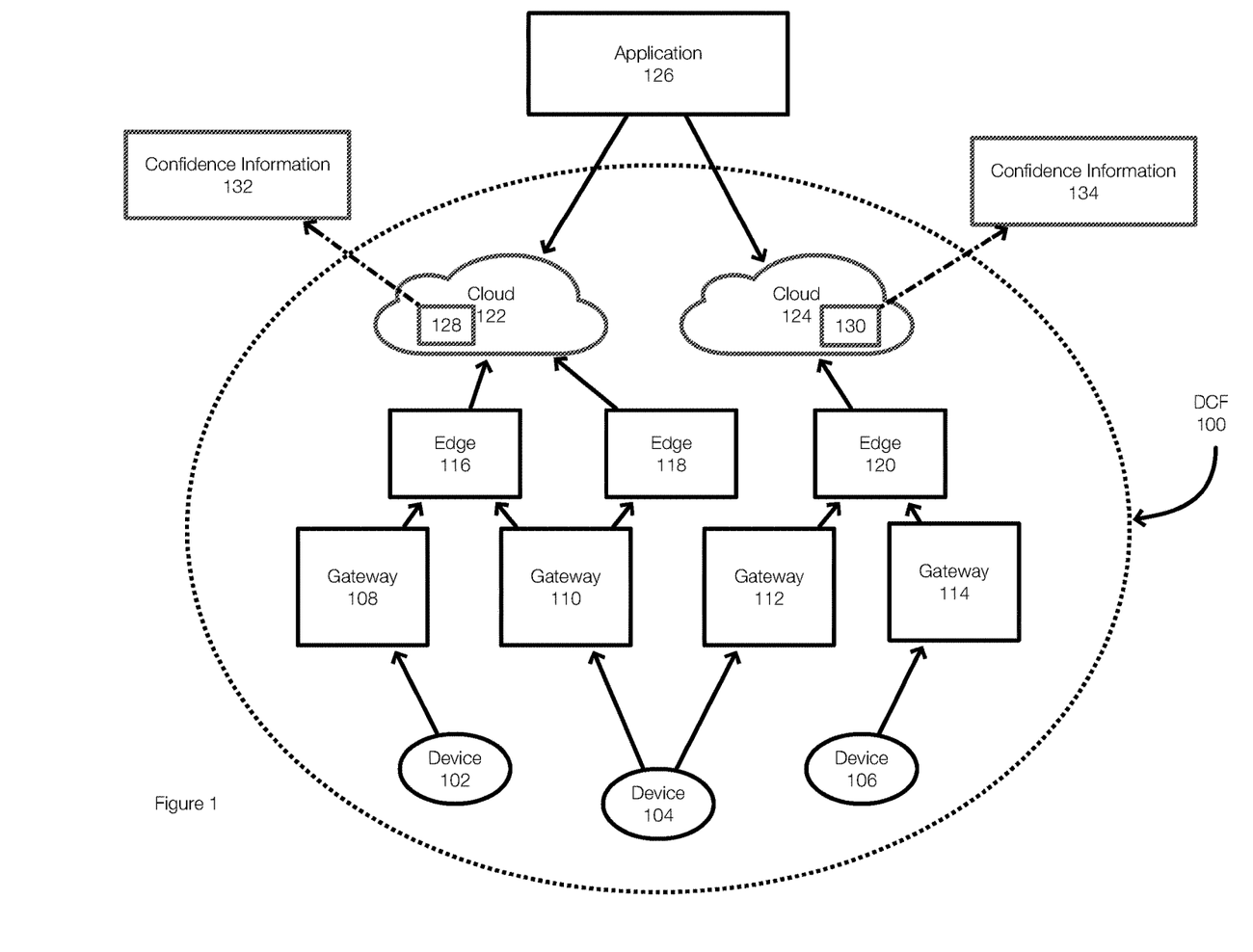
FIG. 1 illustrates an example of a data confidence fabric that includes hardware-assisted trust insertion technologies in confidence scores.

FIG. 1 illustrates and example of a data confidence fabric (DCF 100). The DCF 100 includes varies computing and hardware components, connections, and environments. The DCF 100 is configured to add confidence scores to data flowing in the DCF 100.

FIG. 1 illustrates examples of data flows or paths in the DCF 100. A specific path of specific data may be referred to as a graph. As discussed in more detail herein, the graph of data can be retained an audited.

In FIG. 1, data generated by devices 102, 104, and 106 may flow through multiple levels or multiple hardware environments such as gateways 108, 110, 112, and 114, edges 116, 118, 120, and clouds 122 and 124. In one example, the data may be stored in the clouds 122 and 124.

As the data 128 and the data 130 flow through the DCF 100, the DCF 100 may add provenance and trust metadata or scoring to the data. Embodiments of the invention strengthen the confidence scores given by software by creating trusted hardware perimeters along the edges of the DCF 100 as well as within the boundaries of the DCF 100. The perimeters may include outer perimeters and/or internal perimeters.

After flowing through the DCF 100, the data 128 (which may have been generated by one of the devices 102, 104, and/or 106) is stored in the cloud 122 and made available to an application 126. Similarly, the data 130 may be made available to the application 126. The data 128 is associated with confidence information 132 and the data 130 is associated with confidence information 134. The confidence information 132 and 134 may include confidence scores, provenance data, audit trails, data graphs, applied trust insertion technologies, or the like.

Data flowing through a hardware-assisted DCF is typically more valuable at least because there is more trust or confidence data and higher confidence scores.

Figure 2:
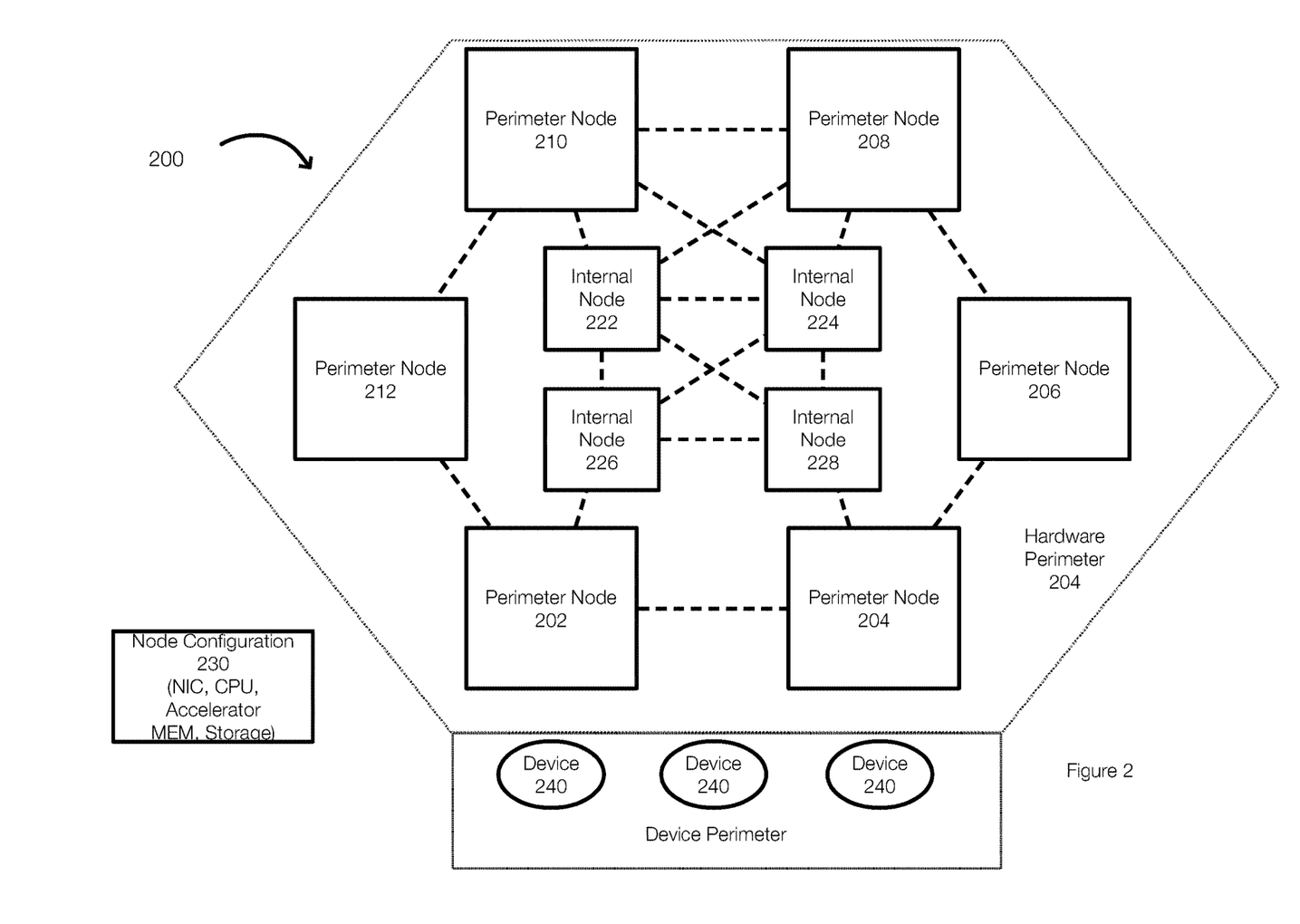
FIG. 2 illustrates another example of a data confidence fabric and illustrates perimeter nodes, internal nodes, and potential node configurations including hardware assisted or based trust insertion technologies.

FIG. 2 illustrates another example of a DCF that is able to add confidence scores from a hardware perspective and/or a software perspective. The DCF 200 is illustrated by way of example only and is an example of the DCF 100. The configuration of a DCF (number of nodes, hardware characteristics of the nodes, network connections, node arrangement, or the like) can vary.

In this example, the DCF 200 includes a hardware perimeter 204 that includes perimeter nodes 202, 204, 206, 208, 210 and 212. Each of the perimeter nodes is aware of the trust characteristics of the other perimeter nodes (or at least one other node) and are configured to worth together as part of the DCF 200. The perimeter nodes 202, 204, 206, 208, 210, and 212 are configured to insert trust into data ingested from the devices 240 using trust insertion technologies. More specifically, the perimeter nodes are able to insert or associate trust or confidence scores into the data using hardware-assisted features.

The perimeter nodes may have different hardware characteristics. The node configuration 230 illustrates an example configuration. Thus, the perimeter nodes may include one or more network interface cards (NICs), CPUs or processors or cores, accelerators, memory, immutable storage, or the like. Thus, each of the perimeter nodes may have varying trust capabilities that can be offered to the DCF 200.

FIG. 2 further illustrates that the DCF may include internal nodes, represented by internal nodes 222, 224, 226 and 228. The perimeter nodes can communicate with the internal nodes and with each other and with other devices that are not part of the DCF 200.

For example, the internal nodes 222, 224, 226 and 228 may form or include a protected storage layer that securely stores data in a scalable way that is protected from unauthorized access. The perimeter nodes may focus on data forwarding and/or computation and/or analytics. Some of the perimeter nodes may be adapted for data ingestion while other perimeter nodes may provide secure computing. However, the nodes are trusted once they are added to the DCF 200 and this trust allows the nodes to be aware of other nodes, their abilities, and their trust insertion capabilities.

Before using the trust insertion technologies, it may be necessary to create a DCF. This may be achieved in a variety of manners. In one example, an initial node may be seeded with an acceptable configuration. This node may then have the ability to join other nodes to the DCF based on the configuration.

Figure 3:
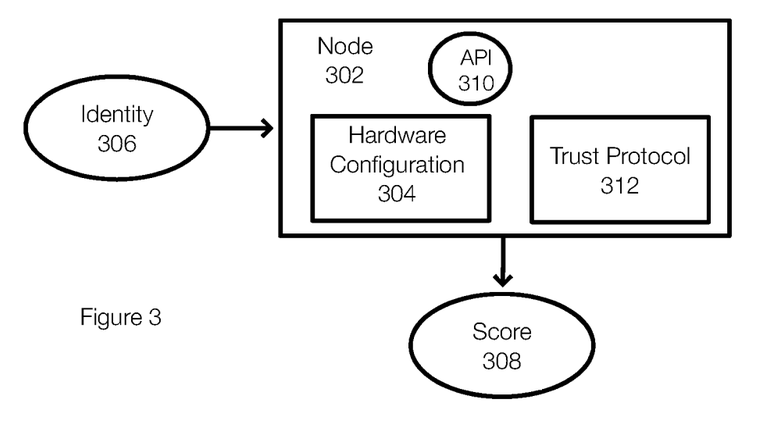
FIG. 3 illustrates an example of providing a node with an identity.

Initially, a node is provided with an identity. This identity is usually specific to a specific DCF. FIG. 3 illustrates an example of establishing a node with an identity. In FIG. 3, the node 302 is provisioned with an identity 306. The identify 306 is an example of DCF identity. In one example the identity 306 may associate the node 302 to a specific DCF. The node 302 is then able to operate for that DCF, but not for another DCF. For example, a company may have internal systems and each system can be configured as a different DCF. The company may have a DCF for video sensor data and may have a DCF for temperature sensor data. This may ensure, for example, that applications are not provided with the wrong type of data.

The identity 306 may include or be associated with secrets or keys that can be used to prove the identity 306. When preparing a DCF for hardware assisted trust scoring or hardware-based trust scores, the node 302 is provisioned with the identity 306. For example, a perimeter node such as a gateway may receive the identity 306 during manufacture. An administrator could also manually configure the node 302 with the identity 306 when deploying the node 302 in the DCF environment (e.g., within the DCF's geography). The identity may be signed with a private key. This allows the use of the public key to verify the identity.

The identity 306 may uniquely identify the node 302 as part of a specific DCF. As previously stated, there can be any number of DCFs and an entity or may have several specific identities. Other identities may be public-based identities or community-based identities. As a result, DCFs are not necessarily limited geographically and may include hardware from multiple environments using multiple connections.

When the node 302 operates, the node 302 may evaluate its hardware capabilities. In other words, the node 302 is able to offer certain hardware capabilities to the DCF. By evaluating its own hardware, the node 302 can determine a score 308 based on the hardware capabilities. Examples of hardware characteristics or hardware based trust insertion technologies include, but are not limited to, co-processors or accelerators that can perform fast trust insertion, encryption or other functions, the present of smart NICs that are DCF aware and that can prevent the non-authorized placement of data into memory, the ability to perform fast-switching or routing of data while guaranteeing the privacy of the payload, secure embedded storage capabilities, secure enclaves for compute operations, deterministic routing, hardware based encryption and compression, or the like or combination thereof.

The node 302 may also be configured to communicate the score 308 to other nodes or applications. The node 302 may also communicate additional confidence information (hardware model, brand, firmware, specifications, capabilities, etc.) that was used to determine the confidence score or trust score of the node 302.

The node 302 may also be associated with an API (Application Programming Interface) 310. The API 310 may allow the node 302 to prove its ability to perform a trust operation. For example, the API 310 may allow the node 302 to prove that the node 302 has an accelerator that is able to encrypt data within a given time window. If the node 302 is attempting to join a DCF, a node performing a join protocol may test the hardware capabilities using the API 310.

The score 308 can be a singular number such as a percentage, an aggregate of different capabilities (each hardware trust insertion technology may receive a score such as CPU (score A), NIC (score B), secure compute enclave (score C)). These scores can be combined in various manners and/or kept independent.

The node 302 may also have or be associated with a trust protocol 312. The trust protocol 312 allows the node 302 to communicate its DCF trust or confidence score to other entities or nodes. The trust protocol 312 may also allow the node 302 to communicate the types of trust insertion technologies that are used to calculate the score 308.

FIG. 3 thus illustrates an example of a node 302 that has been configured to operate in a DCF and contribute trust or confidence scores to data flowing through that DCF.

Figure 4:
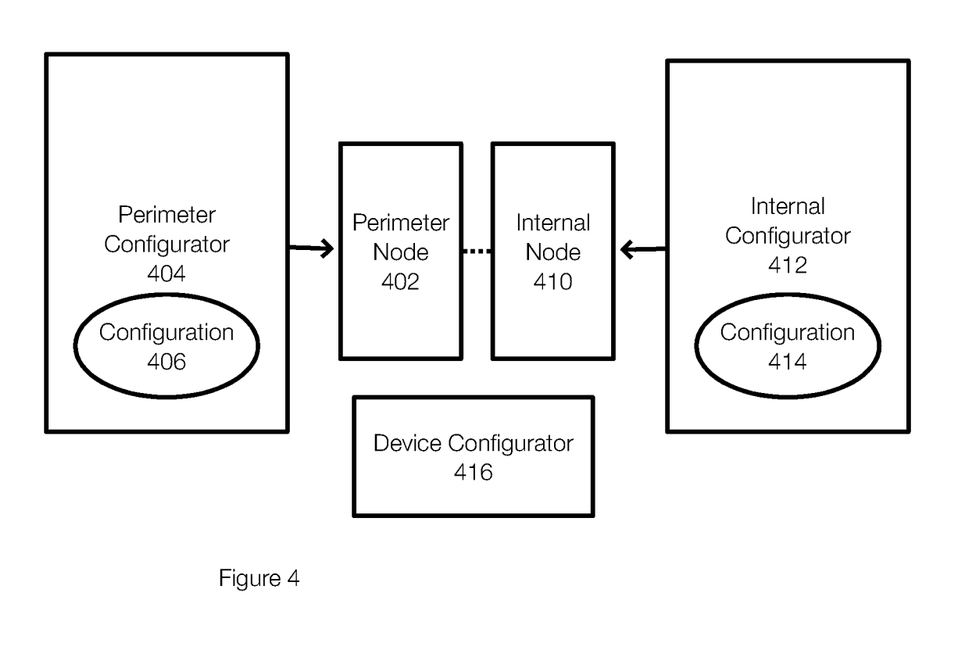
FIG. 4 illustrates an example of configuring perimeter nodes, internal nodes, and/or devices in a data confidence fabric.

Next, a DCF may be configured. This can be achieved by seeding a node and allowing other nodes to request to join the DCF. FIG. 4 illustrates an example of seeding a node in a DCF system. In this example, the seeded node may have been provided with an identity as described with respect to FIG. 3. The external and/or internal perimeters of the DCF can be established.

FIG. 4 illustrates a node 402 and a perimeter configurator 404. The node 402 has an identity for a specific DCF. The configurator 404 is an example of an interface that allows the node 402 to be configured for operation in a specific DCF as a perimeter node. An internal configurator 412 that is associated with a configuration 414 may be available to seed/configure internal nodes of the DCF. In one example, the configurators 404 and 412 may be the same and may adapt to the node being configured.

More specifically, the node 402 is prepared or configured to be part of a DCF as a perimeter node. When creating or seeding a node, the node 402 is required to have a configuration equal to at least the configuration 406. The configuration 406 may be a minimum configuration for example. The configuration 406 may also be more rigorous and require no more and no less that what is specified in the configuration 406. The node 402, in this example, may be a seed node that is programmed or configured with a perimeter configuration and/or a minimum trust score. The configurator 404, for example, may specify certain hardware requirements. The configurator 404 may require the node 402 to have smart NICs, secure compute enclaves and no storage capability or storage prevention. Of course, the specific configuration may vary.

Once the perimeter node 402 is seeded or configured, the perimeter node 402 may be allowed to execute a join protocol that allows other nodes to join as perimeter nodes. Similarly, once the internal node 410 is seeded or configured with a configuration 414, the internal node 410 may execute a join protocol for adding internal nodes to the DCF.

In one example, the internal configurator 412 (and/or the configurator 404) may specify hardware assisted requirements. The configuration 414 may identify minimum scores, encryption capabilities, immutable storage, or the like. The internal configurator 412 (and/or the perimeter configurator 404) can allow the perimeter nodes and the internal nodes to be treated in different manners. For example, perimeter and internal nodes can be configured to be reachable by any other node or device, even devices that do not have a DCF identity. Alternatively, the internal nodes may be firewalled and only accessible by perimeter nodes that have the correct DCF identity. This allows the internal nodes to insert trust into the data or the data streams while being protected from external attacks. The configurators 404 and 412 may also be used to change the a DCF, such as by adding nodes, reconfiguring nodes, removing nodes, determining data paths, or the like or combination thereof.

FIG. 4 also illustrates a device configurator 416. In this example, the devices (sensors, cameras, AR/VR devices, tablets, etc.) that feed data into the DCF may also be configured as part of the DCF. With a device configurator 416, devices can become part of the DCF perimeter (or part of the DCF interior) as least because the devices may have hardware assisted capabilities and thus provide trust insertion technologies. When hardware operates on data, these hardware-assisted abilities can be used to contribute trust or a confidence score to the associated data.

FIG. 4 thus illustrates that the first node or set of nodes in a DCF should be programmed or configured to comply with the requirements of the configuration 406 or the configuration 414. A seed node can be programmed in this manner. Seeding may include providing the node with the appropriate hardware to satisfy the configuration 406. The perimeter configurator 404 may then interface with the node to set hardware settings, configure firewalls, or perform other hardware related requirements needed to satisfy the configuration 406.

Figure 5:
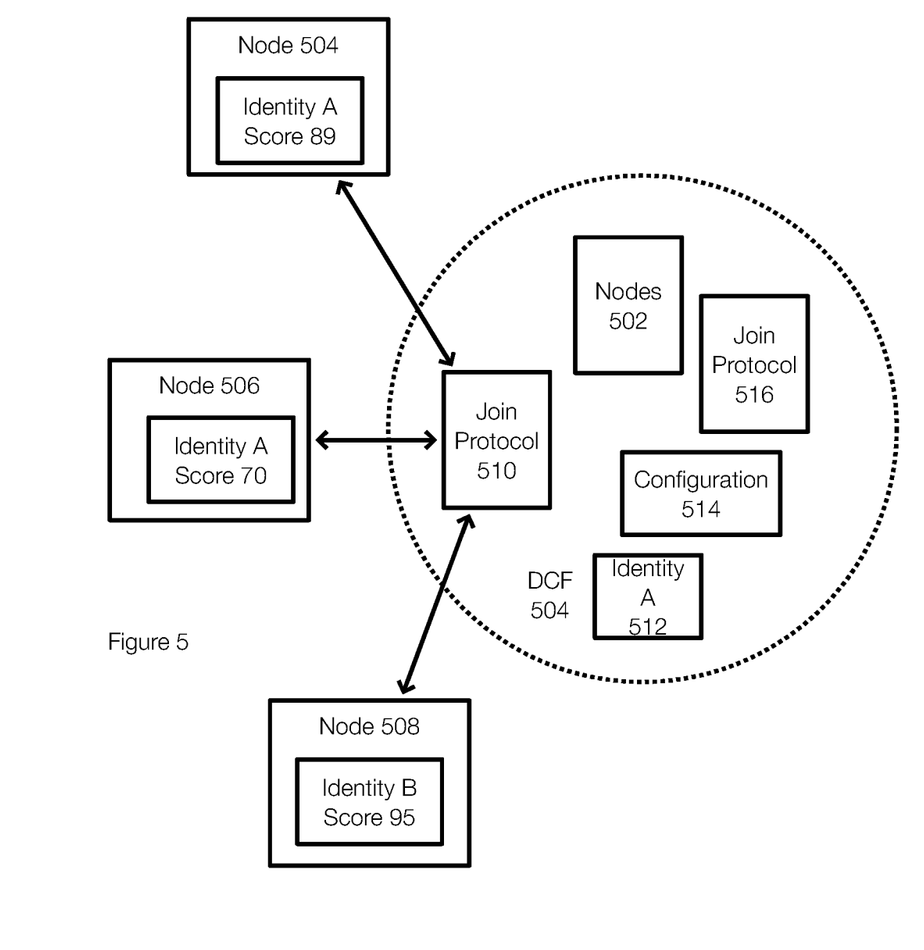
FIG. 5 illustrates an example of a join protocol that allows nodes to join a data confidence fabric.

FIG. 5 illustrates an example of nodes that are attempting to join a DCF and illustrates an example of a method for joining a DCF. The DCF 504 includes hardware environments or components represented by the nodes 502. The nodes 504, 506 and 508 are attempting to join the DCF 504. In this case, the join protocol 510 is applied, for example by one of the nodes 502. The joint protocol 510 may allow nodes to be added, changed, removed, or the like. If a node experiences a change in hardware, for example, the node may be required to rejoin the DCF.

In this example, the DCF 504 may be associated with an identity A 512, a node configuration 514, and the like. If the identity 512 of the DCF 504 is identity A, the join protocol 510 will determine that the nodes 504 and 506 satisfy this requirement. In one example, the identities of the nodes 504 and 506 can be validated using a public key to verify their identity. The Node 508, however, has an identity B. The node 508 is not permitted to join the DCF 504 in this example for that reason alone in one example. Validation may involve encryption and/or decryption.

In addition, the joint protocol 510 may specify a minimum score. Thus, the scores of the nodes 504, 506, and 508 are also evaluated in addition to their identity. A score that is too low may indicate that the hardware is insufficient for contributing trust in the DCF 504 or that the node lacks certain hardware or that the node is not satisfactory from the perspective of the DCF 504. If the minimum score is 80, then the node 506 is rejected even though the node 506 has the correct identity A.

The node 502 of the DCF 504 that is performing the join protocol 510 can challenge or verify the identity and score of nodes requesting to join the DCF 504. For example, the node 502 may ask for a signature that proves an identity. The node 502 may also ask the requesting node to execute a hardware capability, such as encrypting data within a certain timeframe. In this example, the join protocol 510 may also require that the requesting node prove its ability to perform certain hardware-based trust insertion technologies.

The DCF 504 may also be associated with a join protocol 516 for internal nodes. The join protocol 516 allows internal nodes to be changed (e.g., added, removed, edited, reconfigured). The join protocol 516 may be similar to the join protocol 510 for a perimeter node. The join protocol 516 may also have a different set of requirements. For example, a node requesting to join the DCF 504 as an internal node may be rejected if the requesting node is accessible outside of the perimeter of the DCF 504. The rejection is due to the fact that this arrangement may expose the data path in a negative manner or in a manner that reduces the confidence in the data.

As illustrated in FIGS. 4 and 5, nodes or devices can be added to a DCF, boundaries of the DCF can be established, and internal pathing of hardware-assisted trust insertion can be applied. In addition, data can be routed in a trusted manner. For example, a perimeter node may receive data (e.g., sensor data) from a device. The perimeter node may have the ability to route the data to an internal node or another perimeter node that has a specific level of trust. For example, a perimeter node may be able to accept the sensor data and then route the data based on the scores of the potential nodes or based on other reasons, such as hardware capabilities. In one example, a rule may be created such that data is only to be handled by nodes with a certain identity and a trust score that is above a threshold value. Thus, the configurations of the nodes in the DCF may also be associated with rules that are resolved according to hardware considerations (and/or software considerations).

As nodes choose a path over which to move edge data, each node can record that certain hardware capabilities or certain trust insertion technologies have been used to insert trust or confidence into the data. Recording the operation and success/failure of the trust insertion technologies also serves as an audit trail.

Figure 6:
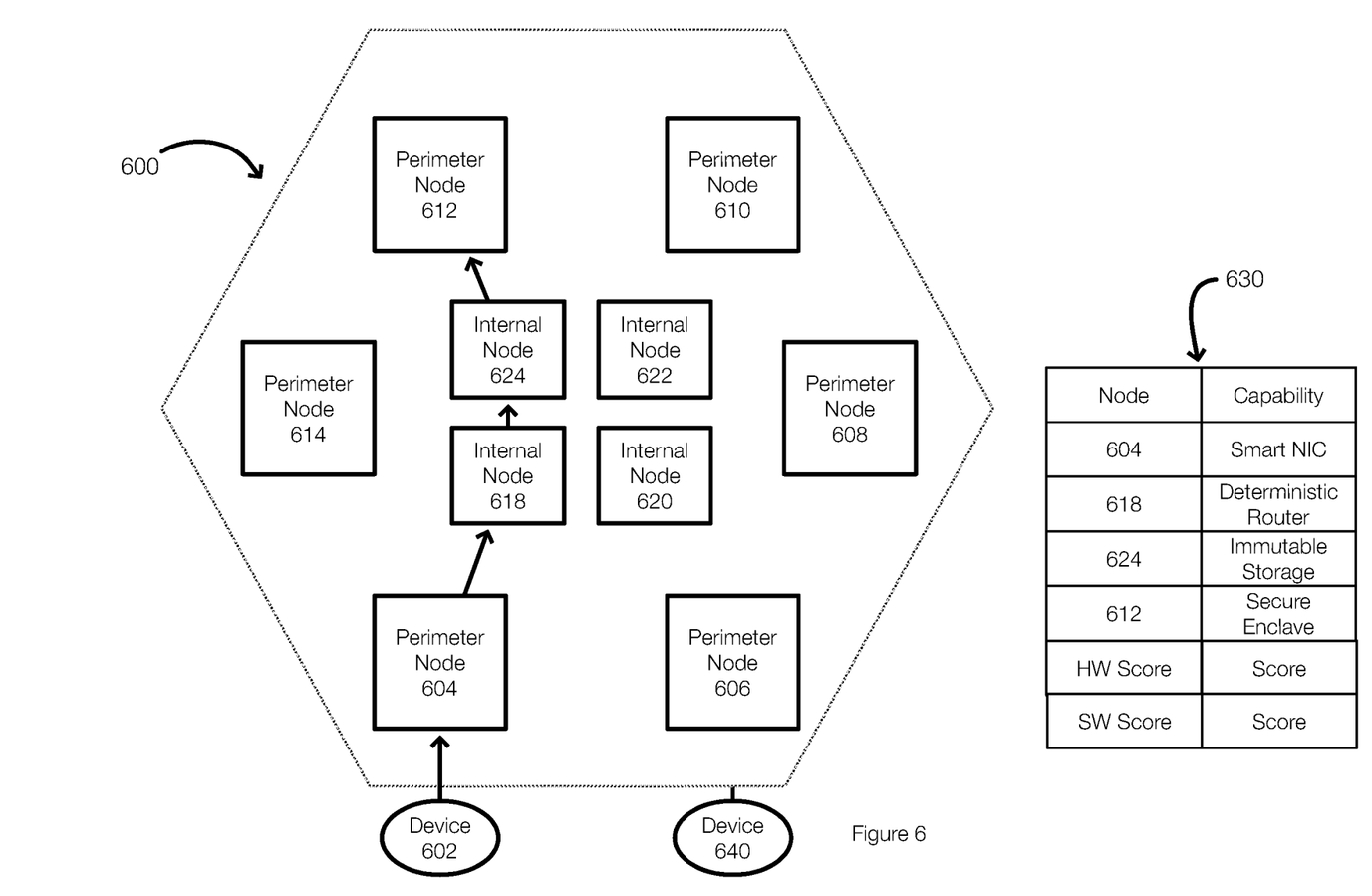
FIG. 6 illustrates an example of a data graph and of auditing capability in a data confidence fabric from a hardware perspective.

FIG. 6 illustrates an example of a flow path of data or of a data stream in a DCF and illustrates an auditable trust path. FIG. 6 illustrates a DCF 600 that include perimeter nodes (nodes 604, 606, 608, 610, 612, and 614) and internal nodes (nodes 618, 620, 622, and 624).

In FIG. 6, a device 602 generates data that is ingested into the DCF 600. The data is initially received by a perimeter node 604. In this example, the perimeter node 604 includes a smart NIC that can reject readings from unknown sensors. This hardware assisted capability can add to the trust or confidence score of the data generated by the device 602. This trust insertion technology thus inserts a confidence score reflecting that the data came from a known sensor.

As the data flows in the DCF 600, an entry is made in the table 630, which is an example of confidence information and which can be used as an audit trail. The table 630 indicates that the node 604 applied a computer-assisted trust insertion (a smart NIC) in this example. Next, the data flows to the internal node 618, which has deterministic routing capability. This hardware-assisted trust insertion routes the data to the internal node 624. The node 624 has immutable storage and this hardware-assisted trust insertion further contributes to the confidence score of the data. The perimeter node 612 has a secure compute enclave, which allows protected applications to run and use the data.

Each of these trust insertion and trusts insertion technologies is reflected in the table 630. In one example, a pointer to the table 630 may be appended to the data. The pointer may point to the table 630 and may also represent a hash of the table to prevent tampering.

The table 630 may also store a hardware confidence score and/or a software/service confidence score. These scores represent a confidence level in the data. These scores can be considered separately, together, in a weighted manner, or in other combinations. Further, the table 630 graphs the flow of the data in the DCF 600 and identifies the specific trust insertions applied to the data. This type of auditing ability allows, by way of example, the scores to be reevaluated if an error is determined or for other reasons. The scores can be revised as well. For example, it may be discovered that a certain hardware-assisted trust insertion technology (deterministic routing) was not routing in a deterministic manner. This allows the scores to be revised accordingly.

The table 630 is an example of an audit trail that can identify various trust insertions that happened to the data. The audit trail may identify where the data was persisted (even temporarily), when a request to destroy was received, or the like. The table 630 may also allow the data to be securely deleted from the DCF because all known storage locations are identified in the table 630.

The table 630 and/or other confidence information may be stored in a ledger or other blockchain technology.

FIG. 6 also illustrates an example of trust-based routing. FIG. 6 illustrates a device 640 that generates data that is ingested into the DCF 600. In this example, the data from the device 640 is received by the perimeter node 606. The perimeter node 606 can forward the data, after or while applying a hardware-assisted or based trust insertion technology, to the internal node 618 or the internal node 620. In one example, the trust or confidence scores of the internal nodes 618 and 620 are known or discoverable by the perimeter node 606. For data from the device 640, a rule may be created that the data should only be handled by nodes that have a certain identity and that have a certain minimum trust score. If the trust score of the internal node 618 is too low, the data may be forwarded to the internal node 620 in this example.

FIGS. 1-6 illustrate examples of hardware trust boundaries and graphs in a data confidence fabric. FIGS. 1-6 also illustrate block diagrams. It is understood that these Figures also illustrate methods for establishing or generating trust boundaries, perimeters, graphs, and confidence information from a hardware perspective.

Figure 7:
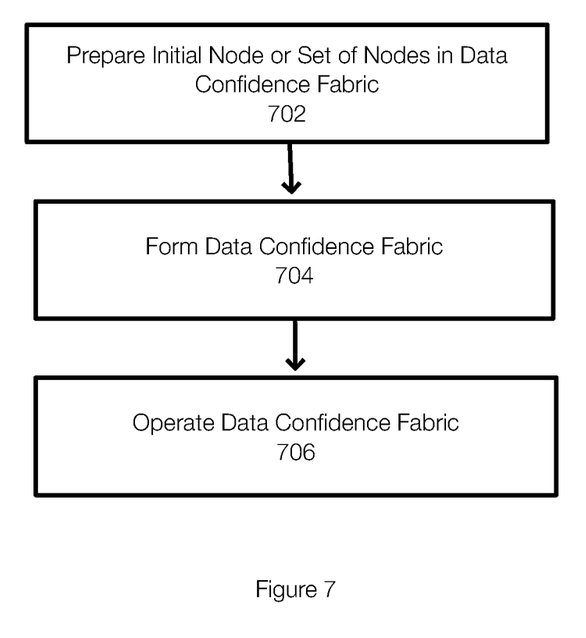
FIG. 7 illustrates an example of a method for establishing or operating a data confidence fabric.
Figure 8:
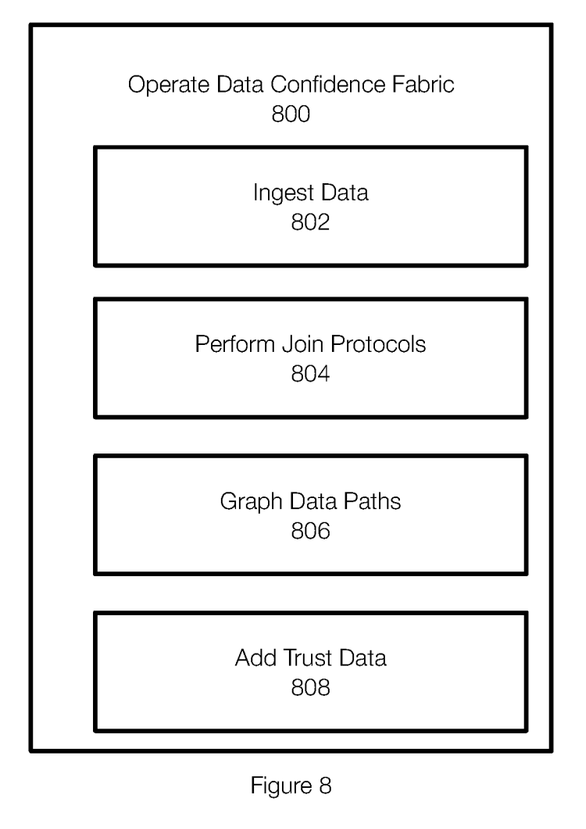
FIG. 8 illustrates an example of a method for operating a data confidence fabric.

FIGS. 7 and 8 further illustrates aspects of embodiments disclosed herein. These elements may be performed in varying order and all elements may not be required in some embodiments. FIG. 7 illustrates an example of a method for operating a DCF. The method begins by preparing 702 an initial node or set of nodes for a DCF. This may include providing these nodes with an identity, evaluating their hardware to determine a hardware based score, configuring the hardware and providing the nodes with appropriate hardware, identifying various protocols including join and trust protocols, or the like or combination thereof.

The data confidence fabric is then formed 704. This may include deployment of the hardware in an ecosystem. Forming the DCF may also include joining other nodes to the DCF as perimeter nodes and/or internal nodes, devices, or the like. The DCF is then operated 706.

FIG. 8 illustrates an example of a method for operating 800 a DCF. Generally, the operation includes ingesting 802 data from devices into the DCF. Trust insertion technologies are applied as the data flows through the DCF and trust data is added or associated 808 with the data. The trust data may include confidence scores that were determined for each node (each node may evaluate itself and its capabilities to generate a score).

The operation of the DCF may also include performing 804 join protocols. This may include receiving a request to join the DCF, evaluating the requesting node (check identity and score and testing capability). The operation of the DCF may also include performing audits, graphing 806 data paths. In general, the operation of the DCF includes performing the hardware assisted or based trust insertion technologies. Records are kept and can be used to graph the flow of data, revise the scores, or the like.

Embodiments of the invention provide hardware with visibility into the configuration of a DCF and insight as to how trust or confidence scores are added to the data as it flows across hardware. Nodes are aware of how other nodes insert trust, the scores of the other nodes, and the like. This awareness allows trust to be added in a beneficial manner. By accounting for the confidence added by the hardware-assisted trust insertion technologies, the hardware can be configured to act in a manner that best protects and enhances the data with confidence information or other trust metadata.

Embodiments of the invention further allow confidence scores to be added to data with an emphasis on the hardware-assisted trust insertion technologies in addition to any confidence information added to data flowing through the hardware.

Embodiments of the invention provide hardware nodes with an identity. This identity allows the nodes to record themselves as handlers of the data and prove that the data passed through the nodes. This is reflected in an audit trail.

Embodiments of the invention also allow operations to be controlled or restricted. For example, some hardware may be limited in their ability to protect the data. These nodes may be limited in their ability to view, store, modify, forward, delete, or the like. Thus, certain trusted nodes can further protect the data by encrypting and/or compressing the data.

Embodiments of the invention further enable data to be routed in a deterministic manner or in another manner, such as based on trust or confidence scores. Embodiments of the invention allow the data path to be controlled. In addition, incoming requests can be rejected when the nodes are aware of the DCF. For example, requests from nodes that do not have a sufficient score or a proper identity can be rejected.

Embodiments of the invention further allow data to be processed deterministically. Because the capabilities of the hardware are known in the DCF (one node may be aware of another node's capabilities), data can be processed by or routed to appropriate nodes such that the data is handled deterministically (e.g., arrives at regular intervals). This helps achieve on-time application processing.

The audit trail also allows data to die-in-place. The audit trail identifies each location at which the data was stored and allows data to be deleted or otherwise processed.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data confidence fabric operations. Such operations may include, but are not limited to, establishing data confidence fabrics, adding nodes (perimeter and internal) to the DCF, establishing identities for the DCFs, establishing scores, generating audit trails and confidence information, ingesting data, scoring data, performing hardware-based trusts insertion technologies to insert trust data. More generally, the scope of the invention embraces any operating environment in which the disclosed concepts may be useful.

At least some embodiments of the invention provide for the implementation of the disclosed functionality in existing platforms, examples of which include the EdgeX Foundry. In general however, the scope of the invention is not limited to any particular data backup platform or data storage environment.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients or nodes that are capable of collecting, modifying, and creating, data. As such, a particular client or node may employ, or otherwise be associated with, one or more instances of each of one or more applications that perform such operations with respect to data.

Devices in the operating environment may take the form of software, physical machines, or virtual machines (VM), containers, dedicated machines, sensors, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Embodiment 1. A data confidence fabric including perimeter nodes, wherein each of the perimeter nodes is configured with a hardware-based trust insertion technology, internal nodes, wherein each of the internal nodes is configured with a hardware-based trust insertion technology, wherein the perimeter nodes are configured to provide a trust boundary for the data confidence fabric, and wherein the perimeter nodes and the internal nodes each add hardware based confidence information to data flowing through the data confidence fabric.

Embodiment 2. The data confidence fabric of embodiment 1, further comprising a plurality of devices configured to generate the data, wherein the data is ingested into the data confidence fabric through the perimeter nodes.

Embodiment 3. The data confidence fabric of embodiment 1 and/or 2.

Embodiment 4. The data confidence fabric of embodiment 1, 2, and/or 3, further comprising an application, wherein the application is configured to use the data and a confidence score of the data associated with the hardware-based trust insertion technologies.

Embodiment 5. The data confidence fabric of embodiment 1, 2, 3, and/or 4, wherein the hardware-based trust insertion technologies include one or more of a secure computing enclave, a smart network interface card, immutable storage, an accelerator deterministic routing, routing while guaranteeing payload privacy.

Embodiment 6. The data confidence fabric of embodiment 1, 2, 3, 4, and/or 5, wherein at least one of the perimeter nodes and the internal nodes is configured with a join protocol that determines whether a requesting node joins the data confidence fabric.

Embodiment 7. The data confidence fabric of embodiment 1, 2, 3, 4, 5 and/or 6, wherein the join protocol is configured to evaluate an identity of the requesting node, a score of the requesting node, and test a hardware-based insertion technology of the requesting node.

Embodiment 8. The data confidence fabric of embodiment 1, 2, 3, 4, 5, 6, and/or 7, further comprising a memory configured to store confidence information that includes a confidence score of the data attributable to the trust insertion technologies applied by the perimeter nodes and the internal nodes.

Embodiment 9. The data confidence fabric of embodiment 1, 2, 3, 4, 5, 6, 7, and/or 8, wherein the confidence information includes an audit trail that identifies trust insertion technologies applied to the data and wherein a graph of the data flowing through the data confidence fabric can be determined from the confidence information.

Embodiment 10. The data confidence fabric of embodiment 1, 2, 3, 4, 5, 6, 7, 8, and/or 9, further comprising a memory storing rules, wherein the rules are configured to enable trust-based routing of the data within the data confidence fabric.

Embodiment 11. The data confidence fabric of embodiment 1, 2, 3, 4, 5, 6, 7, 8, 9, and/or 10, wherein each perimeter node and each internal node is configured to compute its own trust score based on its own trust insertion technologies.

Embodiment 12. A node including a processor and a memory, a trust insertion technology configured to perform a hardware-based trust insertion for data flowing through a data confidence fabric, wherein the memory is configured to store an identity and a confidence score associated with the hardware-based trust insertion technology, wherein the identity is configured to be verified, wherein the memory is configured to store a join protocol configured to add nodes to the data confidence fabric.

Embodiment 13. The node of embodiment 12, wherein the join protocol is configured to verify an identity of a requesting node requesting to join the data confidence fabric, determine a confidence score of the requesting node, and test a hardware-based trust insertion technology of the requesting node.

Embodiment 14. The node of embodiment 12, and/or 13, wherein the join protocol is configured for joining perimeter nodes or internal nodes to the data confidence fabric.

Embodiment 15. The node of embodiment 12, 13, and/or 14, wherein the trust insertion technology comprises one or more of a secure computing enclave, a smart network interface card, immutable storage, an accelerator deterministic routing, routing while guaranteeing payload privacy.

Embodiment 16. The node of embodiment 12, 13, 14, and/or 15, wherein the memory is configured to store rules, the rules configured to establish paths for data in the data confidence fabric and trust based routing for the data.

Embodiment 17. The node of embodiment 12, 13, 14, 15, and/or 16, further comprising a table configured to store confidence information, the confidence information including scores applied by trust insertion technologies in the data confidence fabric and an audit path.

Embodiment 18. Methods for performing data fabric operations shown in one or more of FIGS. 1-8 or portions thereof.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to the Figures any one or more of the entities disclosed, or implied, by and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

The physical computing device includes a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components XXX of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A data confidence fabric comprising:
   perimeter nodes, wherein each of the perimeter nodes is configured with a hardware-based trust insertion technology;
   internal nodes, wherein each of the internal nodes is configured with a hardware-based trust insertion technology;
   wherein the perimeter nodes are configured to provide a trust boundary for the data confidence fabric, and wherein the perimeter nodes and the internal nodes through which data passes each apply a trust insertion technology to the data such that hardware based confidence information is added to the data flowing through the data confidence fabric, each hardware based confidence information comprising a confidence score of hardware of one of the perimeter nodes and internal nodes.

2. The data confidence fabric of claim 1, further comprising a plurality of devices configured to generate the data, wherein the data is ingested into the data confidence fabric through the perimeter nodes.

3. The data confidence fabric of claim 1, further comprising an application, wherein the application is configured to use the data and the confidence score of the data associated with the hardware-based trust insertion technologies.

4. The data confidence fabric of claim 1, wherein the hardware-based trust insertion technologies include one or more of a secure computing enclave, a smart network interface card, immutable storage, an accelerator deterministic routing, routing while guaranteeing payload privacy.

5. The data confidence fabric of claim 1, wherein at least one of the perimeter nodes and the internal nodes is configured with a join protocol that determines whether a requesting node joins the data confidence fabric.

6. The data confidence fabric of claim 5, wherein the join protocol is configured to evaluate an identity of the requesting node, a score of the requesting node, and test a hardware-based insertion technology of the requesting node.

7. The data confidence fabric of claim 6, further comprising a memory configured to store confidence information that includes a confidence score of the data attributable to the trust insertion technologies applied by the perimeter nodes and the internal nodes.

8. The data confidence fabric of claim 7, wherein the confidence information includes an audit trail that identifies trust insertion technologies applied to the data and wherein a graph of the data flowing through the data confidence fabric can be determined from the confidence information.

9. The data confidence fabric of claim 1, further comprising a memory storing rules, wherein the rules are configured to enable trust-based routing of the data within the data confidence fabric.

10. The data confidence fabric of claim 1, wherein each perimeter node and each internal node is configured to compute its own trust score based on its own trust insertion technologies.

11. A node comprising:
a processor and a memory;
a trust insertion technology configured to perform a hardware-based trust insertion for data flowing through a data confidence fabric, wherein the hardware-based insertion is performed by applying the hardware-based trust insertion technology to the data such that the data is associated with a confidence score associated with the hardware-based trust insertion technology;
wherein the memory is configured to store an identity and the confidence score associated with the hardware-based trust insertion technology, wherein the identity is configured to be verified;
wherein the memory is configured to store a join protocol configured to add nodes to the data confidence fabric, the join protocol is configured to initiate a test of a hardware capability of the requesting node.

12. The node of claim 11, wherein the join protocol is configured to verify an identity of a requesting node requesting to join the data confidence fabric and determine a confidence score of the requesting node.

13. The node of claim 12, wherein the join protocol is configured for joining perimeter nodes or internal nodes to the data confidence fabric.

14. The node of claim 11, wherein the trust insertion technology comprises one or more of a secure computing enclave, a smart network interface card, immutable storage, an accelerator deterministic routing, routing while guaranteeing payload privacy.

15. The node of claim 11, wherein the memory is configured to store rules, the rules configured to establish paths for data in the data confidence fabric and trust based routing for the data.

16. The node of claim 11, further comprising a table configured to store confidence information, the confidence information including scores applied by trust insertion technologies in the data confidence fabric and an audit path.

* * * * *